US009501553B1

(12) United States Patent
Hollister et al.

(10) Patent No.: US 9,501,553 B1
(45) Date of Patent: Nov. 22, 2016

(54) ORGANIZATION CATEGORIZATION SYSTEM AND METHOD

(71) Applicant: Humana Inc., Louisville, KY (US)

(72) Inventors: Andrew B. Hollister, Springboro, OH (US); Elizabeth Barth-Thacker, Lanesville, IN (US)

(73) Assignee: Humana Inc., Louisville, KY (US)

( * ) Notice: Subject to any disclaimer, the term of this patent is extended or adjusted under 35 U.S.C. 154(b) by 93 days.

(21) Appl. No.: 14/697,135

(22) Filed: Apr. 27, 2015

Related U.S. Application Data

(63) Continuation of application No. 13/750,641, filed on Jan. 25, 2013, now Pat. No. 9,020,945.

(51) Int. Cl.
*G06F 17/30* (2006.01)
*G06F 9/50* (2006.01)
(Continued)

(52) U.S. Cl.
CPC .......... *G06F 17/30598* (2013.01); *G06F 9/50* (2013.01); *G06F 17/30917* (2013.01);
(Continued)

(58) Field of Classification Search
CPC ................ G06F 17/30598; G06F 17/30917; G06F 9/50; G06Q 10/06; H04L 67/306; H04L 67/10; H04L 43/0817
(Continued)

(56) References Cited

U.S. PATENT DOCUMENTS 5,530,903 A * 6/1996 Calvignac ............. G06F 13/364 710/243
5,689,708 A * 11/1997 Regnier ................. G06F 9/468 709/229
(Continued)

FOREIGN PATENT DOCUMENTS

GB 2492899 A * 1/2013 .......... G06F 11/3409

OTHER PUBLICATIONS

Ghazarian et al., "Automatic Detection of Users' Skill Levels Using High-Frequency User Interface Events", in User Modeling and User-Adaped Interaction, Jun. 2010, vol. 20, Issue 2, pp. 109-146.*
Heim et al., "User Profiles for Adapting Speech Support in the Opera Web Browser to Disabled Users", in C. Stephanidis and M.
(Continued)

*Primary Examiner* — Phuong Thao Cao
(74) *Attorney, Agent, or Firm* — Standley Law Group LLP

(57) ABSTRACT

An organization categorization system and method is disclosed. The organization categorization system and method relies on server data to discover which business organizations are consuming the finite resources of the server and in what proportions. Organizations are categorized according to their consumption of resources. The categorization system and method further ascribes a relative business value to each organization to facilitate the allocation of resources among the various organizations in a business. In an example embodiment, users of the server resources use the SAS programming language and the server resources execute SAS applications that support the SAS programming language. The organization categorization system and method connects an executed computer program to a business-defined classification of applicability to purpose. The system and method employs a double level of abstraction to link specific programming styles, first to a general solution
(Continued)

case, and then to link the general solution idiomatically to the business case.

18 Claims, 1 Drawing Sheet

(51) Int. Cl.
   *H04L 29/08* (2006.01)
   *G06Q 10/06* (2012.01)
   *H04L 12/26* (2006.01)

(52) U.S. Cl.
   CPC ............. *G06Q 10/06* (2013.01); *H04L 67/306* (2013.01); *H04L 43/0817* (2013.01)

(58) Field of Classification Search
   USPC ........................................................ 707/737
   See application file for complete search history.

(56) References Cited

U.S. PATENT DOCUMENTS

| | | | | |
|---|---|---|---|---|
| 5,848,396 | A * | 12/1998 | Gerace | G06Q 30/02 705/14.49 |
| 5,907,831 | A * | 5/1999 | Lotvin | G06Q 30/02 434/322 |
| 5,966,538 | A * | 10/1999 | Granston | G06F 8/443 717/158 |
| 6,292,798 | B1 * | 9/2001 | Dockter | G06F 21/6218 |
| 7,035,919 | B1 * | 4/2006 | Lee | H04L 67/1095 709/203 |
| 7,047,177 | B1 * | 5/2006 | Lee | H04L 41/0823 703/22 |
| 7,454,705 | B2 * | 11/2008 | Cadez | H04L 41/0893 707/999.007 |
| 7,702,779 | B1 * | 4/2010 | Gupta | G06F 9/50 709/220 |
| 7,729,992 | B2 * | 6/2010 | Rose | G06Q 20/0855 705/14.11 |
| 7,734,297 | B1 * | 6/2010 | Narkilahti | H04W 24/00 370/331 |
| 7,831,795 | B2 * | 11/2010 | Prahlad | G06F 17/30528 711/170 |
| 7,873,610 | B2 * | 1/2011 | Poulsen | G06Q 90/00 707/694 |
| 8,209,758 | B1 * | 6/2012 | Doukhvalov | H04L 63/1433 726/24 |
| 8,214,364 | B2 * | 7/2012 | Bigus | G06F 21/316 707/737 |
| 8,249,904 | B1 * | 8/2012 | DeSantis | G06F 9/5088 370/465 |
| 8,260,921 | B2 * | 9/2012 | Uyama | G06Q 10/04 705/7.29 |
| 8,402,514 | B1 * | 3/2013 | Thompson | H04L 63/08 726/4 |
| 8,650,194 | B2 * | 2/2014 | Hu | G06Q 10/00 707/737 |
| 8,713,535 | B2 * | 4/2014 | Malhotra | G06F 15/173 717/126 |
| 8,813,028 | B2 * | 8/2014 | Farooqi | G06F 8/34 717/107 |
| 9,020,945 | B1 * | 4/2015 | Hollister | G06F 9/50 707/737 |
| 9,098,333 | B1 * | 8/2015 | Obrecht | G06F 11/30 |
| 2003/0028871 | A1 * | 2/2003 | Wang | H04H 60/65 725/9 |
| 2003/0177376 | A1 * | 9/2003 | Arce Velleggia | G06F 21/33 713/189 |
| 2004/0260652 | A1 * | 12/2004 | Rose | G06Q 20/0855 705/51 |
| 2005/0052992 | A1 * | 3/2005 | Cloonan | H04L 12/5695 370/229 |
| 2005/0120113 | A1 * | 6/2005 | Bunch | H04L 43/06 709/224 |
| 2005/0234973 | A1 * | 10/2005 | Zeng | G06N 5/02 |
| 2006/0218278 | A1 * | 9/2006 | Uyama | G06Q 10/04 709/226 |
| 2007/0232396 | A1 * | 10/2007 | Yoo | G07F 17/32 463/42 |
| 2009/0007067 | A1 * | 1/2009 | Hepper | G06F 9/4443 717/115 |
| 2009/0070378 | A1 * | 3/2009 | Cho | G06F 19/3443 |
| 2009/0228914 | A1 * | 9/2009 | Wong | G06Q 30/0205 725/32 |
| 2009/0234941 | A1 * | 9/2009 | Ammerlaan | G06F 9/505 709/224 |
| 2009/0292743 | A1 * | 11/2009 | Bigus | G06F 21/316 |
| 2009/0293121 | A1 * | 11/2009 | Bigus | G06F 21/316 726/22 |
| 2009/0327482 | A1 * | 12/2009 | Malhotra | G06F 15/173 709/224 |
| 2010/0114946 | A1 * | 5/2010 | Kumar | G06F 17/30035 707/770 |
| 2010/0185630 | A1 * | 7/2010 | Cheng | G06F 17/30867 707/756 |
| 2010/0312612 | A1 * | 12/2010 | Carr | G06Q 10/06 705/7.29 |
| 2011/0055211 | A1 * | 3/2011 | Mei | G06F 21/6218 707/737 |
| 2011/0066615 | A1 * | 3/2011 | Pradhan | G06F 17/30699 707/737 |
| 2011/0131589 | A1 * | 6/2011 | Beaty | G06F 9/5077 719/318 |
| 2011/0137776 | A1 * | 6/2011 | Goad | G06Q 20/102 705/34 |
| 2011/0153612 | A1 * | 6/2011 | Paul | G06F 17/30905 707/740 |
| 2011/0173637 | A1 * | 7/2011 | Brandwine | G06F 9/5072 719/314 |
| 2011/0179030 | A1 * | 7/2011 | Lee | G06F 17/30625 707/737 |
| 2011/0248822 | A1 * | 10/2011 | Sarihan | H04N 7/15 340/5.81 |
| 2011/0264649 | A1 * | 10/2011 | Hsiao | G06N 5/022 707/722 |
| 2011/0271327 | A1 * | 11/2011 | Palmer | G06F 21/629 726/4 |
| 2011/0295727 | A1 * | 12/2011 | Ferris | G06F 11/34 705/34 |
| 2012/0047219 | A1 * | 2/2012 | Feng | G06F 17/3071 709/207 |
| 2012/0109956 | A1 * | 5/2012 | Ramaiyer | G06F 17/30867 707/737 |
| 2012/0158503 | A1 * | 6/2012 | Mardikar | G06Q 30/0269 705/14.53 |
| 2012/0173250 | A1 * | 7/2012 | Jeffrey | G06Q 30/02 705/1.1 |
| 2012/0226559 | A1 * | 9/2012 | Baum | G06Q 30/02 705/14.66 |
| 2012/0226560 | A1 * | 9/2012 | Chang | G06Q 30/02 705/14.66 |
| 2012/0323720 | A1 * | 12/2012 | Markle | G06Q 30/00 705/26.1 |
| 2013/0122854 | A1 * | 5/2013 | Agarwal | H04L 12/141 455/405 |
| 2013/0226837 | A1 * | 8/2013 | Lymberopoulos | G06F 17/30902 706/12 |
| 2013/0275578 | A1 * | 10/2013 | Williams | H04L 43/0882 709/224 |
| 2013/0297611 | A1 * | 11/2013 | Moritz | H04H 60/31 707/737 |

(56) References Cited

U.S. PATENT DOCUMENTS

2014/0040017 A1* 2/2014 Bafna ................ G06Q 30/0246
                                                            705/14.45
2014/0181102 A1* 6/2014 Lu .......................... G06N 7/005
                                                            707/734
2014/0189102 A1* 7/2014 Fruchtman ............ G06F 21/105
                                                            709/224

OTHER PUBLICATIONS

Pieper (Eds.): ERCIM UI4ALL Ws 2006, LNCS 4397, pp. 154-172, 2007.*
Song et al., "Classifying Behavior Patterns of User Nodes", in Proceedings of 2012 International Conference on Cloud Computing and Social Networking (ICCCSN), Apr. 2012, 4 pages.*
Stanton et al., "Analysis of End User Security Behaviors", in Computer & Security, vol. 24, Issue 2, Mar. 2005, pp. 124-133.*

* cited by examiner

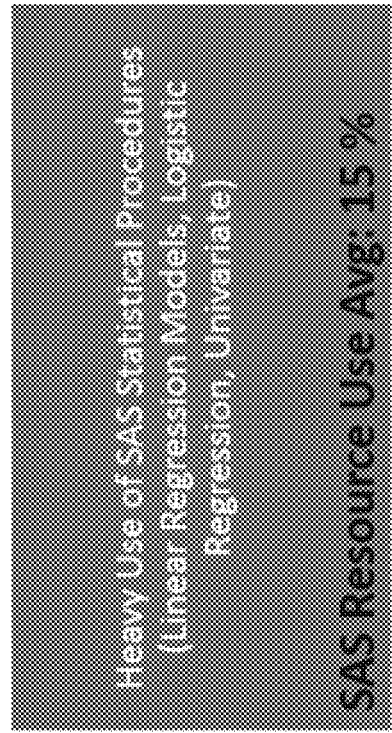 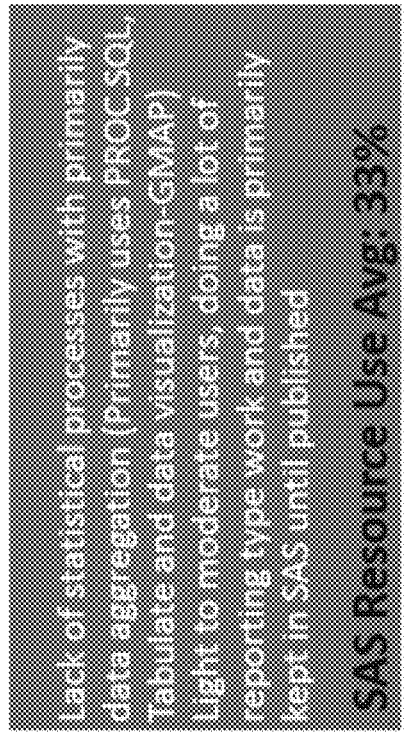 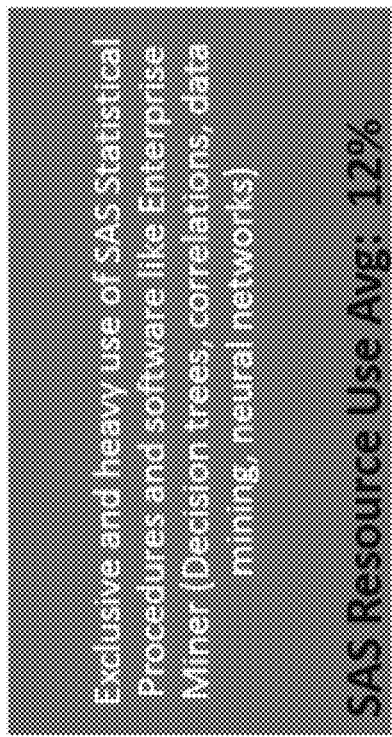

ORGANIZATION CATEGORIZATION SYSTEM AND METHOD

CROSS-REFERENCE TO RELATED APPLICATIONS

This application is a continuation of patent application Ser. No. 13/750,641 filed on Jan. 25, 2013. The above application is incorporated by reference in its entirety as if fully recited herein.

BACKGROUND

Resource allocation is a key aspect of efficient management of highly used resources such as server-based software packages. As user demand increases, server resources become scarce and may not be adequate to meet user demand. If server resources are inadequate to meet user demand, a business or organization may experience financial or other losses as users are unable to complete important tasks or activities.

When server resources are insufficient to meet the demands of all users, they are typically allocated according to established priorities. Establishing priorities, however, can be difficult for a business or organization. While any business or organization would like to meet the needs of all users, such a goal is impractical or even impossible. At best, the business or organization is likely to be able to meet all the needs of only a small subset of the user population. A more likely scenario is that every user's needs can be met over time but each user may not have the unrestricted access to the server resources that he or she would desire at any time.

To best meet the of the server user population, it is important for a business or organization to understand how users use the resources. Unfortunately, many businesses and organizations simply make assumptions about users and their use of the resources. Such assumptions, however, are often partially or even entirely false. Any solution that is developed, therefore, relies on the false assumptions. As a result, they are often simplistic and unsatisfactory.

Rather than rely on assumptions, a better approach is to collect usage data. One way to learn how resources are used is to survey users regarding their use. Such an approach however, requires not only appropriately drafted questions but also complete and accurate answers to the questions from the users. Users may try to answer the questions completely and accurately but may over- or under-estimate their usage. User perceptions may be as inaccurate as assumptions.

Even if user-reported usage data may be collected, it may be difficult for the business or organization to understand the data and more importantly, how to allocate resources based on the data. Certain groups of users may have similar needs that can be satisfied with an appropriate resource allocation strategy but it may be difficult for the business or organization to discern the groups from the data. Even if the groups can be discerned, the business or organization must decide how to allocate resources to the groups. In an attempt to satisfy at least a portion of users in each group, businesses and organizations typically consider the needs of each group without consideration of the businesses' or organizations' needs. There is a need for a user categorization system and method that can facilitate the identification of user groups based on actual server usage data.

SUMMARY

The present disclosure is directed to a user categorization system and method. The user categorization system and method relies on actual server data to discover which users are consuming the finite resources of the server and in what proportions. Users are categorized according to their consumption of resources. The user categorization system and method further ascribes a relative business value to each user group to facilitate the allocation of resources among groups. In an example embodiment, users of the server resources use the SAS programming language and the server resources execute SAS applications that support the SAS programming language.

The user categorization system and method connects an executed computer program to a business-defined classification of applicability to purpose. The system and method employs a double level of abstraction to link specific programming styles, first to a general solution case ("design pattern"), and then to link the general solution idiomatically to the business case. Users are clustered into categories, which result from the application of rules or functions that answer "how, what and how many" particular design patterns (or measure attributes) were used by the user.

BRIEF DESCRIPTION OF THE DRAWINGS

FIG. 1 is a block diagram illustrating categorization of users according to an example embodiment.

DETAILED DESCRIPTION

In an example embodiment, the system and method connects an executed computer program to a business-defined classification of applicability to purpose. The program employs a double level of abstraction. Programming styles are first linked to a general solution case ("design pattern"), and then the general solution is linked idiomatically to the business case. Users are clustered into categories based on the application of rules or functions that determine "how, what and how many" particular design patterns (or measure attributes) were used by the user.

The mechanism used for the solution is a system using a taxonomy of programming techniques, called "design patterns," the resource use of each executed computer program component associated to it as "measures," and defining an idiomatic "cross reference" between the design patterns and figurative business meaning used to solve business management defined problems. In the definition of the taxonomies, the emphasis is on the business's perspective of problems and solutions.

First, a data cube is created to define a high dimensional array of values using attributes of the target system. This delineates the universe in which the users operate. Attributes are collected that could be used to describe the user's programming behavior. In an example embodiment, these attributes fall into three broad categories: program language writing style; computer resource consumption; and business organizational classification (dept and manager, etc). Enumerated lists are created for each attribute. These lists define the "vocabulary" and cardinality of the attributes. Some of the attributes (notably, resource consumption) remain to be used as "measures," but are also grouped into lists of "dimensions" by way of clusters or bands of values.

The specific categories into which the attributes are organized are malleable and may be defined by the business need. Sometimes categories are mutually exclusive, but it is not required. The categorization technique is grounded in demographic clustering analysis. A preference assignment hierarchy for attributes found in multiple categories may be established based on business value preference or by ordering the measures.

An aggregation of all the attributes and measures by each of the attribute categories is performed. This step provides the ability to define additional measures as a ratio of the whole. This is in addition to the absolute sums used as measure values. The attributes are then matched together such that it is possible to identify (for example) one user, one program block, and the resources associated to that specific interaction, also known as a "tuple." Higher order groups of collections are then also possible.

The first key component is to identify design patterns in the program blocks. Design patterns are an abstraction to the general case of a computer program or part of a computer program that solves a specific commonly occurring problem or key computation function. These patterns are later used as a proxy to associate the program block to a business use and the business value.

The description and definition of design patterns is flexible as long as the abstraction by which the higher concepts are derived from in the usage and classification of literal concepts of the program continue to hold true. A pattern applies to a particular situation, and it is through this applicability that the pattern is used idiomatically to represent a crucial key to the business process, especially when a small but representative sample is recognized as the clue to understanding a larger whole. The range of situations in which a pattern can be used is called its context. A multitude of patterns may be identified that apply to the same context.

The second key component is in defining, creating, and using an idiomatic cross reference between the design patterns and figurative business meaning. Once the idiomatic definition of a user's programming is added as an attribute to the data cube, conventional data mining techniques may be employed to extract previously unknown "interesting patterns" such as groupings of data records (cluster analysis), discovery of unusual records (anomaly detection) and "interesting relations" or dependencies (association rule mining). In this way, it is possible to extract information from the data and transform it into an understandable structure for further use managing the server environment. The following illustrates a technique that may be used. The elements are by no means required or representative of an exhaustive list but they are illustrative.

The data sets use conventional database table design, organized into rows and columns. The columns are also conventionally defined and are classified as keys, dimensions, or measures. (Kimball & Ross—The Data Warehouse Toolkit, 2nd Ed [Wiley 2002])

Multiple intermediate data sets are combined to yield three primary data sets. A time match algorithm matches elements attributes and sums the measures for the time domain. For instance, a SQL step may run for three hours, and the Computer Resource table is measured in five minute increments.

In this case, each of the measures is summed to the timeframe of the SQL step to correctly attribute the measures to the step. It also works in reverse where multiple program steps occur in the time increment on the Computer Resource table. The algorithm method is not important nor is the specific time increment amount. The goal is an accurate assignment of measures to be attributed to any given program step.

TABLE 1

Programming Language Attributes Dataset
Dataset
Program Language Attributes

| | |
|---|---|
| Key | UsedID |
| Key | ProcessID |
| Key | Date timestamp |
| Dimension | Program Block ID |
| Dimension | Program Data Input ID |
| Dimension | Program Data Output ID |
| Dimension | Program Step Summary Code |
| Dimension | Program Step Options |
| Measure | Counts |

TABLE 2

Computer Resource Consumption Dataset
Dataset
Computer Resource Consumption

| | |
|---|---|
| Key | UsedID |
| Key | ProcessID |
| Key | Date timestamp |
| Dimension | Program Block ID |
| Dimension | Program Data Input ID |
| Dimension | Program Data Output ID |
| Measure | CPU Amount Used |
| Measure | I/O Amount Used |
| Measure | Disk Storage Used |

TABLE 3

Business Organization Classification Dataset
Dataset
Business Organization Classification

| | |
|---|---|
| Key | UserID |
| Key | ProcessID |
| Key | Date timestamp |
| Dimension | Department ID |
| Dimension | Supervisor ID |
| Dimension | Program Data Output ID |
| Dimension | Program Step Summary Code |
| Dimension | Program Step Options |
| Dimension | User Profile Category |

A design pattern represents a summary of what a program block accomplishes. It may be defined loosely or in great detail. It does not need to conform to any standard outside of what the programmer might intend. For example, there are many ways to solve a statistical mathematical problem in the SAS programming language. There may first be a sample taken, one or more statistical tests are run on each sample, then one or more regressions (or other statistical calculation) are applied and finally, one or more statistical tests are run on the results. Each design pattern may be defined using a conventional context-sensitive parse tree. The technique of recognition of the pattern accurately in practice and, more importantly, the idiomatic association of one or a group of design patterns to the arbitrary business meaning facilitates the allocation of resources according to user categorizations. The mechanism of the match may be accomplished easily, as simple as a cross-reference lookup table that returns the meaning as an encoded symbol or value. A simple example follows.

TABLE 4

First Level of Abstraction

| Program Step | Resource Use Level (arbitrary units) | Maps to Design Pattern |
|---|---|---|
| UNIVARIATE | More than 7; Less than 20 | |
| REG | Any | |-> Simple Statistic Use |
| LOGISTIC | More than 3; Less than 10 | |
| UNIVARIATE | More than 20 | |
| REG | More than 10 | |-> Average Statistic Use |
| LOGISTIC | More than 10; Less than 50 | |
| Any Combination of above | Sums more than 35 | |

TABLE 5

Second Level of Abstraction

| Design Pattern | Resource Use Measure (arbitrary units) | Maps to User Profile |
|---|---|---|
| Any Statistical Model Activity | In Any Quantity | |
| Any Statistical Computation Activity | Sums to more than 15 | |-> Modeler |
| Simple Statistic Use | | |-> Statistical Use |
| Average Statistic Use | | |
| AND | | |
| Exclusive of Previous Classification Set | | |
| Data Summarization | More than 30 | |
| Data Manipulation | More than 15 | |-> Data ETL Use |
| Average Statistic Use | Less than 9 | |
| Report Creation | Less than 9 | |
| AND | | |
| Exclusive of Previous Two Classification Sets | | |

A variety of management reports based on the results may then be generated. A sample report is shown in the following table.

TABLE 6

User Categorizations

| UserID | Department | User Profile Assignment |
|---|---|---|
| abd123 | e45676 | Modeler |
| sde456 | f56788 | Statistical |
| fgy789 | g56789 | Data_ETL |

Referring to FIG. 1, a block diagram illustrating categorization of users according to an example embodiment is shown. Users may be categorized according to their resource use and based on the needs of the business, resources may be allocated to users in based on the categories. For example, the business may decide to allocate more resources to smaller groups of users that perform functions identified as providing the greatest business value and to allocate fewer resources to larger groups of users that perform functions that are considered less vital to the business.

While certain embodiments of the disclosed system and method for user categorization are described in detail above, the scope of the invention is not to be considered limited by such disclosure, and modifications are possible without departing from the spirit of the invention as evidenced by the claims. For example, design patterns and measurement attributes may be varied and fall within the scope of the claimed invention. The number and types of user categorizations may be varied and fall within the scope of the claimed invention. One skilled in the art would recognize that such modifications are possible without departing from the scope of the claimed invention.

What is claimed is:

1. A computerized method for categorizing business organizations comprising:
   (a) defining at a server a plurality of user programming behavior categories related to an executing computer program;
   (b) receiving at said server for a plurality of users a plurality of execution attributes for each of said plurality of user programming behavior categories;
   (c) receiving at said server a plurality of business organizational classifications which identify said business organizations;
   (d) assigning at said server each of said plurality of user programming behavior categories to at least one of a plurality of programming patterns and a resource use level;
   (e) associating at said server each of said plurality of programming patterns to a resource use measure and a user profile;
   (f) identifying, at said server from the plurality of business organizational classifications, the business organizational classification associated with each of said plurality of users;
   (g) aggregating at said server by organizational classification the programming patterns and resource use measures of users associated with each business organizational classification; and
   (h) assigning at said server to the business organizational classification one of a plurality of profiles according to the aggregated programming patterns and resource use measures.

2. The computerized method of claim 1 wherein said user programming behavior categories are selected from the group consisting of programming writing style, computer resource consumption, and business organizational classification.

3. The computerized method of claim 1 wherein said plurality of execution attributes is selected from the group consisting of program block identifier, program data input identifier, program data output identifier, program step summary code, program step options, CPU amount used, I/O amount used, disk storage used, counts, department identifier, supervisor identifier, and user profile category.

4. The computerized method of claim 1 wherein at least one execution attribute comprises a sum of measures for a time domain.

5. The computerized method of claim 1 wherein said plurality of execution attributes is selected from the group consisting of absolute sums and ratios.

6. The computerized method of claim 1 wherein said resource use level comprises a range of values.

7. The computerized method of claim 1 wherein said resource use measure comprises a range of values.

8. The computerized method of claim 1 further comprising allocating, at said server, resources to a plurality of business organizational classifications according to said plurality of profiles.

9. A computerized method for categorizing business organizations comprising:
   (a) defining at a server a taxonomy of programming techniques invoked in an executing computer program;
   (b) defining at said server for each of said programming techniques a plurality of execution attributes;

(c) defining at said server a time domain for collecting use data for said plurality of execution attributes;
(d) receiving, at said server, use data collected during said time domain for said plurality of execution attributes, said use data collected from a plurality of users executing said computer program;
(e) receiving, at said server, a plurality of business organizational classifications which identify said business organizations;
(f) associating, at said server, one of said plurality of business organizational classifications with each of said plurality of users;
(g) aggregating, at said server, use data by organizational classification from users associated with each business organizational classification;
(h) aggregating at said server for each business organizational classification said use data for said plurality of execution attributes; and
(i) assigning at said server each business organizational classification to one of a plurality of use profiles according to said aggregated use data for said plurality of execution attributes.

10. The computerized method of claim 9 wherein said programming techniques correspond to program blocks of said executing computer program.

11. The computerized method of claim 9 wherein said plurality of execution attributes is selected from the group consisting of program block identifier, program data input identifier, program data output identifier, program step summary code, program step options, CPU amount used, I/O amount used, disk storage used, counts, department identifier, supervisor identifier, and user profile category.

12. The computerized method of claim 9 wherein at least one execution attribute comprises a sum of measures for said time domain.

13. The computerized method of claim 9 wherein said plurality of execution attributes is selected from the group consisting of absolute sums and ratios.

14. The computerized method of claim 9 wherein assigning each business organizational classification to one of a plurality of use profiles comprises assigning said business organizational classification according to resource use levels associated with said aggregated use data.

15. The computerized method of claim 9 further comprising allocating, at said server, resources to each business organizational classification according to said plurality of use profiles.

16. A computerized method for mapping business organizations to a use profile comprising:
(a) defining at a server a plurality of programming steps invoked in an executing computer program;
(b) defining at said server a plurality of execution attributes for measuring resource use of said plurality of programming steps;
(c) defining at said server a plurality of programming step groups, said plurality of programming step groups comprising a plurality of programming steps;
(d) associating at said server with each of said plurality of programming step groups a resource use level;
(e) mapping at said server each of said associated programming steps groups and resource use levels to a programming pattern;
(f) defining at said server a plurality of use profiles, each of said plurality of use profiles associated with a programming pattern and a resource use measure;
(g) receiving, at said server, use data for said plurality of execution attributes, said use data collected from a plurality of users executing said computer program;
(h) associating, at said server, each of the plurality of users with one of a plurality of business organizations;
(i) calculating at said server for said plurality of business organizations at least one resource use measure from said use data of users associated with each of said plurality of business organizations; and
(j) assigning at said server each of said plurality of business organizations to one of said plurality of use profiles according to said business organization's resource use measure.

17. The computerized method of claim 16 wherein said plurality of execution attributes is selected from the group consisting of program block identifier, program data input identifier, program data output identifier, program step summary code, program step options, CPU amount used, I/O amount used, disk storage used, counts, department identifier, supervisor identifier, and user profile category.

18. The computerized method of claim 16 further comprising allocating, at said server, resources to said plurality of business organizations according to said plurality of use profiles.

* * * * *